(No Model.) 2 Sheets—Sheet 1.

H. F. GASKILL.
DOUBLE PISTON ROTARY METER.

No. 414,694. Patented Nov. 12, 1889.

Witnesses.
W. Rossiter
F. H. Mills.

Inventor
Harvey F. Gaskill
By Wm S. Bates
Atty.

(No Model.) 2 Sheets—Sheet 2.

H. F. GASKILL.
DOUBLE PISTON ROTARY METER.

No. 414,694. Patented Nov. 12, 1889.

Witnesses
W. Porter
F. H. Mills.

Inventor
Harvey F. Gaskill
By Wm. S. Bates
Atty.

UNITED STATES PATENT OFFICE.

HARVEY F. GASKILL, OF LOCKPORT, NEW YORK; MARY E. GASKILL EXECUTRIX OF SAID HARVEY F. GASKILL, DECEASED.

DOUBLE-PISTON ROTARY METER.

SPECIFICATION forming part of Letters Patent No. 414,694, dated November 12, 1889.

Application filed September 5, 1888. Serial No. 284,602. (No model.)

*To all whom it may concern:*

Be it known that I, HARVEY F. GASKILL, of Lockport, New York, have invented certain new and useful Improvements in Liquid-Meters, of which the following is a specification.

My invention may be best understood from the accompanying drawings, which represent a meter containing it in the best form as yet devised by me, and in which—

Figure 1:
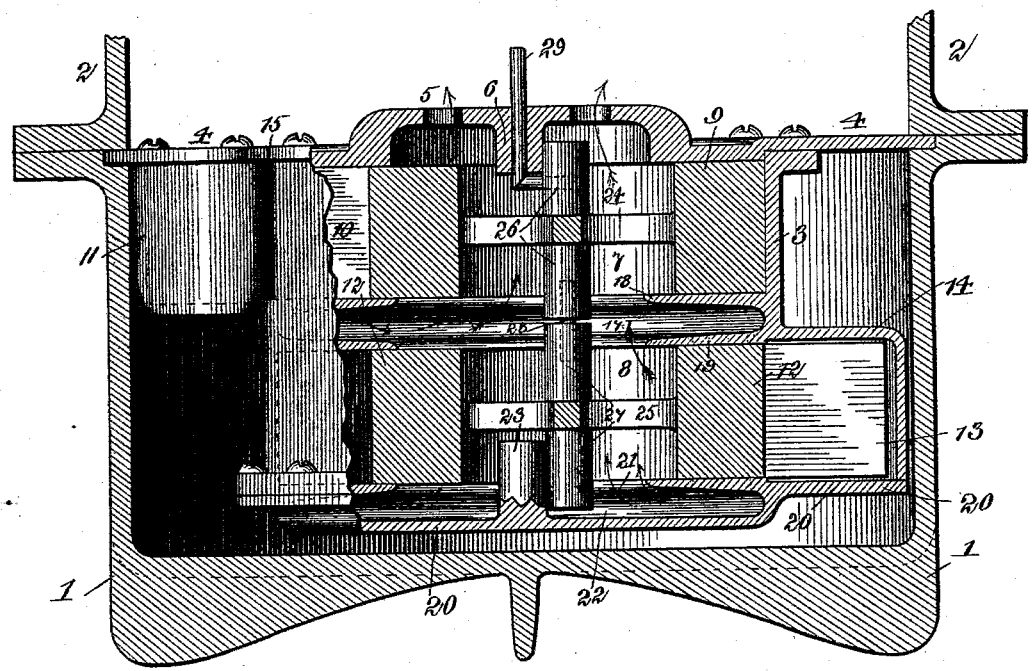
Figure 2:
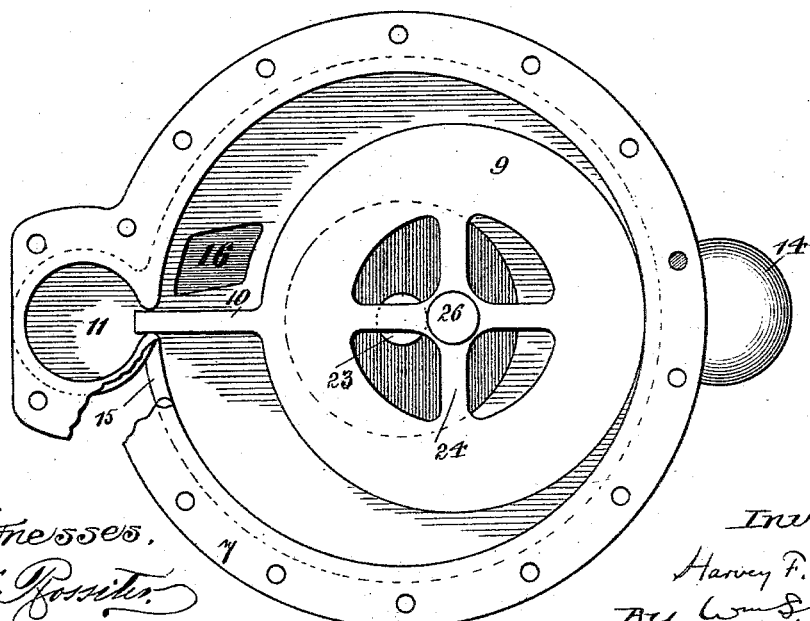
Figure 3:
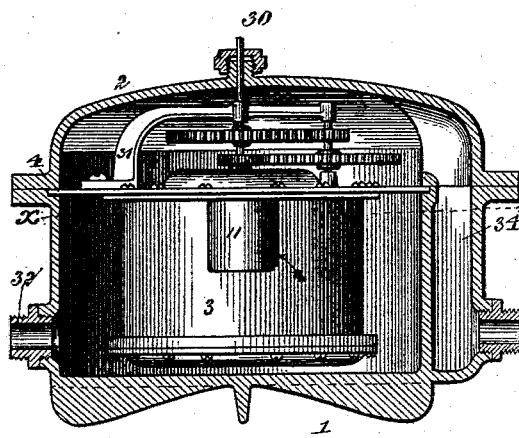
Figure 4:
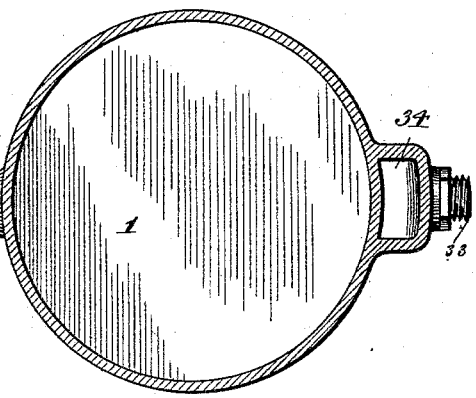
Figure 5:
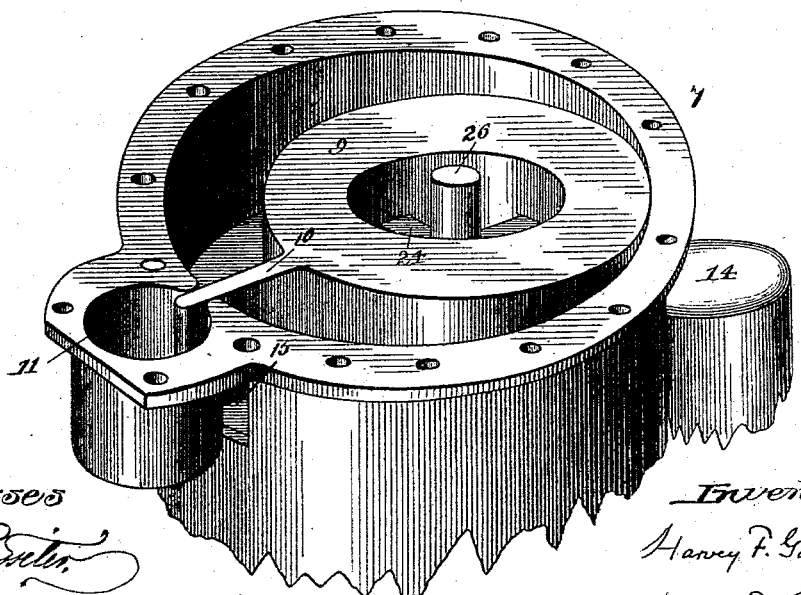

Figure 1 is an elevation, partly in section, with the upper casing omitted. Fig. 2 is a top view of the cylinders. Fig. 3 is a view at right angles to Fig. 1, showing the casing in section and the interior parts in elevation. Fig. 4 is a sectional plan of the casing, taken on line $x$ $x$ of Fig. 3. Fig. 5 is a perspective plan of the cylinders with piston in place.

In the several figures, 1 is the lower casing or shell.

2 is the upper shell or casing.

3 is the cylinder-shell hung from the diaphragm or covering-plate 4, which rests at its edge upon the lower shell 1. The diaphragm or covering-plate is open at its center, but separates the upper and lower shell.

5 is a bridge bridging the central opening of the cover-plate 4 and provided with the depending stud 6.

7 is the upper cylinder.

8 is the lower cylinder.

9 is the piston in the upper cylinder.

10 is a tongue attached to the piston and extending through a slot in the side of the cylinder, so as to separate the space within the cylinder upon one side of the piston from that upon the other side, the separation opposite the tongue being effected by the contact of the piston with the walls of the cylinder.

11 is a chamber in which the end of tongue 10 plays.

12 is the piston of the lower cylinder. 13 is its tongue, and 14 the chamber in which it plays.

15 is the inlet-port of cylinder 7, and 16 (indicated in Fig. 2) is its outlet-port. The inlet and outlet ports of the lower cylinder are diagonally opposite those of the upper cylinder. The two cylinders are separated by a space 17, bounded by annular webs or flanges 18 and 19.

20 is the lower covering-plate. It is provided with a central stud 23 and an annular web or flange 21, beneath which is a space 22. The outlet-ports are in the top cover-plate 4 and the flanges 18, 19, and 21.

The pistons 9 and 12 are in the form of flat-faced annuli, connected by arms 24 and 25 with central hubs 26 and 27. The hubs travel around the studs 6 and 23 when the meter is working, and keep the pistons always in contact with the walls of the cylinders.

28 is a pin connecting the hubs of the two pistons, so that they will move in unison.

29 is a bent or crooked shaft turned by hub 26 as it travels around the stud 6, and serving to communicate motion to the gearing in the upper shell, from which motion is in turn transmitted through shaft 30 to the counting mechanism.

32 is the inlet to, and 33 the outlet from, the meter.

In operation the liquid to be measured follows the course of the arrows. It enters at 32 and fills the lower shell 1 of the meter; thence it enters the cylinders through their peripheral inlet-ports, and, driving the pistons around, passes out through the outlet-ports into the upper shell 2; thence it passes down through channel 34 to the outlet 33.

What I claim is—

1. The combination, substantially as set forth, of the two cylinders axially in line, the pistons oscillating together therein and provided with fixed tongues, as 10, and the chambers in which said tongues play connected with the cylinders, but upon opposite sides thereof.

2. The combination, substantially as set forth, of the two-part shell, one part constituting a chamber for the influent liquid and the other a chamber for the effluent liquid, the diaphragm separating the two parts of the shell, the cylinders supported by said diaphragm and having inlet-ports in their peripheral sides and outlet-ports in their axial sides, the annular flanges 18, 19, and 21, the pistons oscillating together in said cylinders, and the tongues attached to the pistons and playing in chambers located, respectively, in the sides of the cylinders.

HARVEY F. GASKILL.

Witnesses:
F. H. SEYMOUR,
C. H COMES.